Feb. 27, 1923.
H. A. LONGSHORE.
INNER TUBE.
FILED OCT. 19, 1920.
1,446,915.
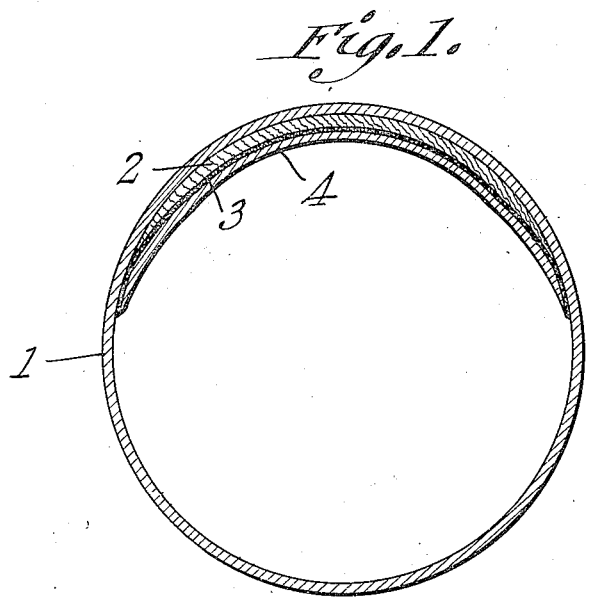
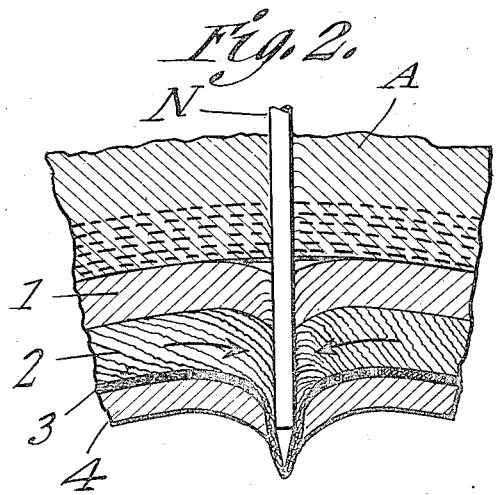
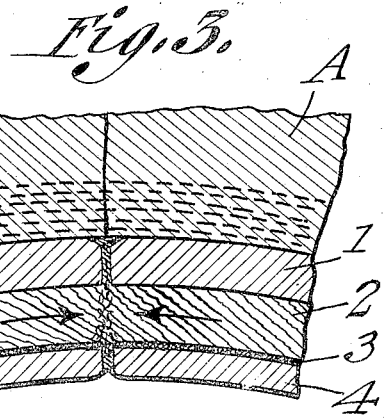
H. A. Longshore
Inventor Patented Feb. 27, 1923.

1,446,915

UNITED STATES PATENT OFFICE.

HERMAN A. LONGSHORE, OF COLUMBUS, OHIO, ASSIGNOR TO NATHANIEL G. WARTH, OF COLUMBUS, OHIO.

INNER TUBE.

Application filed October 19, 1920. Serial No. 417,968.

*To all whom it may concern:*

Be it known that I, HERMAN A. LONGSHORE, a citizen of the United States, residing at Columbus, in the county of Franklin and State of Ohio, have invented a new and useful Inner Tube, of which the following is a specification.

This invention relates to inner tubes of pneumatic tires.

Heretofore in the manufacture of some forms of so called puncture proof or self sealing inner tubes it has been the practice to use a fabric as the tread portion of the tube or as a lamination or insert. The use of this fabric in the manner stated, however, has been objectionable due either to the fact that the fabric has interfered with the elasticity of the tube and prevented the tube from properly adjusting itself, when inflated, against the wall of the casing or, if the fabric has been too large, has caused the tube to buckle and pinch, thereby preventing proper functioning.

One of the objects of the present invention is to combine a mat of fibers with the inner tube and so locate it that it will not interfere with the expansion of the tube or cause its distortion and which will, in the event of a puncture, be forced into the same so as to quickly seal it.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a transverse section through a tube having the present improvements combined therewith.

Figure 2 is a view partly in side elevation and partly in section of a portion of the tube, the same being shown punctured.

Figure 3 is a similar view showing the tube sealed.

Referring to the figures by characters of reference 1 designates the wall of the inner tube formed of cured rubber and arranged upon the inner surface of the tread portion of this wall is a layer of uncured rubber or other sticky plastic material indicated at 2. A layer 3 of matted fibers, preferably vegetable or mineral and of a fluffy and flimsy nature is affixed to the inner surface of the layer 2. On the inner surface of this layer of matted fibers is provided an inner layer of soft vulcanized rubber shown at 4. As the soft vulcanized rubber shown at 4 is not sticky and as the surface of the sticky layer 2 is completely covered by the matted fibers 3, it will be obvious that these fibres 3 do not adhere to the rubber 4.

The tube is placed in a casing A as ordinarily and when inflated the pressure of the air against the inner wall 4 will result in equal distribution of the pressure against the matted fibers and against the layer of sticky plastic material. Should a nail or the like be forced into the tube, as shown in Figure 2, it will, while passing through the layer 2, collect a film of the soft sticky material and force this film through the puncture in the matted fibers and in the inner layer 4. At the same time the plastic material 2, being confined between the layers 1 and 4 will flow toward the nail or other puncturing article indicated at N and pile up at the point of puncture. When the nail is withdrawn it will leave a part of the film of plastic material 2 in the puncture in the layer 4 and will draw some of the matted fibers up through the sticky material 2 and, with a portion of said material, into the puncture in the outer wall 1. The material adhering to the nail after it has been withdrawn from the wall 1 will be stripped off by the inner surface of the casing A and allowed to pile upon the tube at the outer end of the puncture. As soon as the nail has been removed the material 2 will be pressed together at the point of puncture because the pressure of air against the inner layer 4 will produce lines of pressure in the material 2 such as indicated by arrows in Figure 3. The walls of the punctures in the layers 1 and 4 will also be caused to stick together because of the films of sticky material adhering thereto, and the plugging of these punctures will be further insured by the deposits of fibers left therein during the puncturing of the inner layer 4 and the withdrawal of the nail from the wall 1.

What is claimed is:—

1. An inner tube for pneumatic tires including an outer cured portion, an intermediate solid uncured portion arranged upon the tread portion of the tube, a layer of matted fibers joined throughout its area to said uncured portion and an inner layer of cured rubber bearing against the fibrous layer.

2. An inner tube for pneumatic tires including an outer cured portion, an intermediate uncured solid portion upon the inner surface of the outer cured portion, an inner cured portion, and a layer of matted fibers for spacing apart the uncured portion and the inner cured portion, said matted layer adhering to the uncured portion but being free from the inner cured portion.

In testimony that I claim the foregoing as my own, I have hereto affixed my signature in the presence of two witnesses.

HERMAN A. LONGSHORE.

Witnesses:
N. G. WARTH,
CLYDE B. TURNER.